Jan. 17, 1961 H. S. McCONKIE 2,968,343
APPARATUS FOR MOUNTING TUBELESS TIRES
Filed Jan. 22, 1958 3 Sheets-Sheet 1

INVENTOR
Howard S. McConkie
BY
ATTORNEY

Jan. 17, 1961

H. S. McCONKIE 2,968,343

APPARATUS FOR MOUNTING TUBELESS TIRES

Filed Jan. 22, 1958

INVENTOR
Howard S. McConkie

BY *[signature]*
ATTORNEY

Jan. 17, 1961  H. S. McCONKIE  2,968,343
APPARATUS FOR MOUNTING TUBELESS TIRES
Filed Jan. 22, 1958  3 Sheets-Sheet 3

INVENTOR
Howard S. McConkie
BY
ATTORNEY

# United States Patent Office 2,968,343
Patented Jan. 17, 1961

2,968,343
APPARATUS FOR MOUNTING TUBELESS TIRES
Howard S. McConkie, Fort Bragg, N.C.
Filed Jan. 22, 1958, Ser. No. 710,545
3 Claims. (Cl. 157—1.21)

This invention relates to automotive accessories and more particularly to an improved tool for installing tubeless tires to wheel rims.

Many automotive vehicles are now being equipped with tubeless tires, which are channel shaped in cross section and held to the wheel rim by the outward pressure developed when the tire is inflated, the wheel rim being the closure member for the open portion of the tire channel. When a tire is installed, the tire rests loosely in the wheel rim and is difficult, if not impossible, to inflate because the loose engagement of the tire with the rim permits leakage of the inflating air. To overcome this difficulty, there have been provided a number of compression tools of the type which include a ring or loop of strap metal or cable which may be applied to the periphery of the tire at the tread and shortened to squeeze the tire toward the center of the wheel. This effects a bulging of the side walls of the tire to move its free, beaded edges in air sealing contact against the rim.

Such tools have certain disadvantages. For example, it is necessary to apply the loop manually to accurately position the loop along the center of the tire tread, and to hold it in this position until the loop has been shortened sufficiently to squeeze the tire. This generally requires the effort of two men; one to position and hold the loop, and the other to take up the loop by means of a lever, drum or similar device. It has been suggested to combine such loops with a support or frame for properly positioning and holding the tire so that one man can install the tire. But such combined supports and loops as have been suggested are incapable of applying equal pressure to all parts of the tire periphery and, further, are not universally adjustable to install tires of all sizes.

It is a primary object of this invention to provide a tire installing tool, of the character indicated, so constructed as to obviate the stated disadvantages.

Another object is to provide a supporting and clamping device or machine, for squeezing a tire casing to a tire rim, which may be operated by one person without necessity for manually supporting or pressing the tire casing while preparing the tire for inflation.

A further object is to provide a tire supporting and compressing device constructed as an open frame adapted to receive the rim-mounted tire and adjustable to accommodate tires of varying outer diameter and varying cross sectional width.

Yet another object is to provide a tire mounting device of the character indicated in which the frame sides are hingedly connected to each other to permit collapsing of the frame into substantially one plane when not in use.

Another object is to provide a tire mounting device, of the character indicated, whose frame members are extensibly connected to each other to permit increase in the size of the tire to be supported therein, and which further are provided with means for limiting the extension and preventing total separation of such frame members when not intended.

A still further object is to provide a tire mounting device, of the character indicated, which is simple in construction, light in weight, economical to manufacture, and efficient in operation.

The novel features that are considered characteristic of the invention are set forth with particularity in the appended claims. The invention itself, however, both as to its organization and its method of operation, together with additional objects and advantages thereof, will best be understood from the following description of several embodiments when read in connection with the accompanying drawings, wherein like reference characters indicate like parts throughout the several figures and in which:

Figure 1:
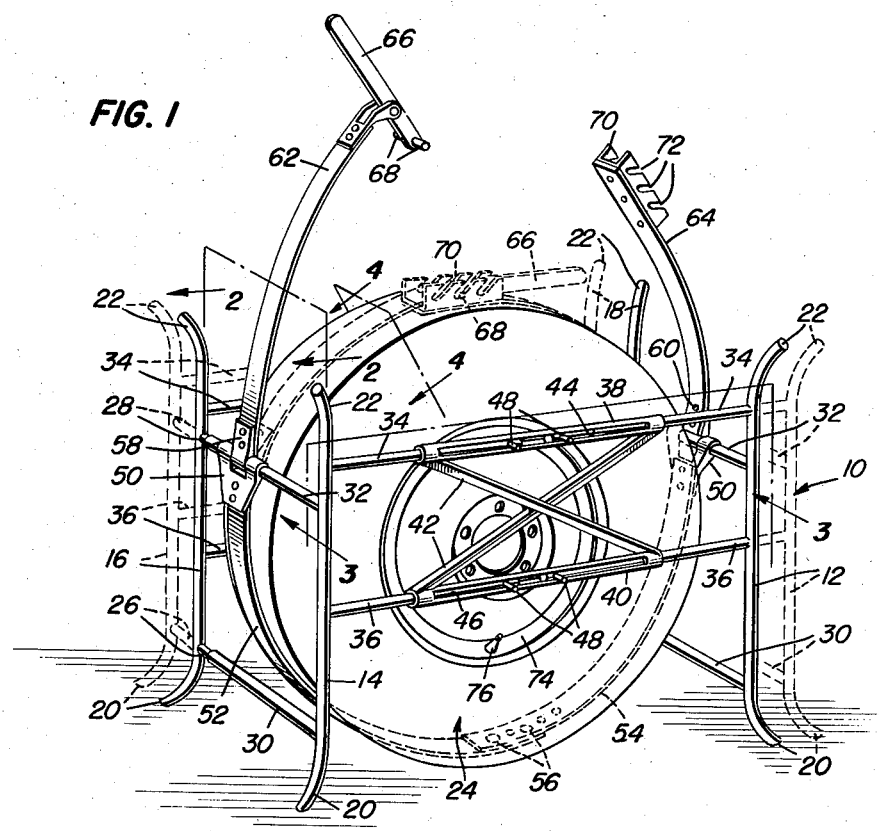
Fig. 1 is a perspective view of a tubeless tire installing device according to the invention with parts of the tire compression loop shown in full lines while being positioned over the tire, and in dotted lines while actually applying squeezing pressure to the tire.
Figure 2:
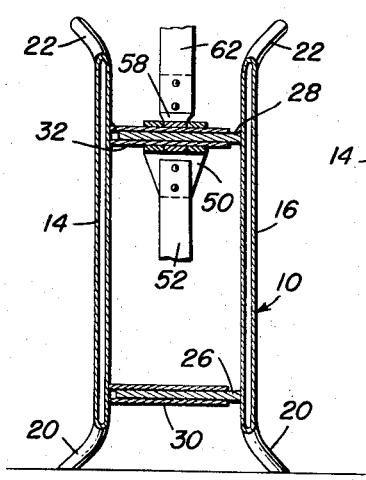
Fig. 2 is a vertical section through one side of the frame of the device taken on line 2—2 of Fig. 1.
Figure 3:
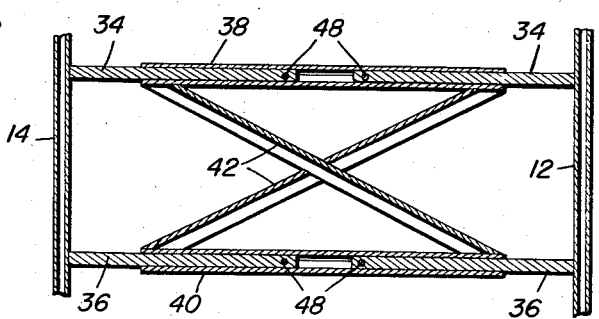
Fig. 3 is a vertical section taken on line 3—3 of Fig. 1, and showing a portion of another side of the frame.
Figure 5:
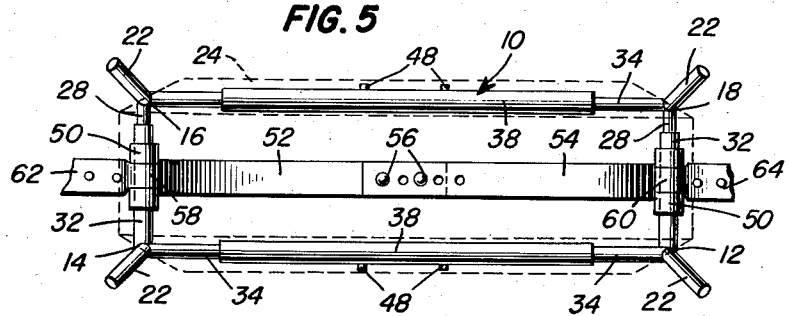
Fig. 5 is a reduced diagrammatic plan view showing a tire being lowered into the frame.

Referring now to the drawings, the tire installing machine comprises a frame, generally indicated at 10, having four upright corner posts 12, 14, 16 and 18 whose bottoms are outwardly turned to form feet 20. Each post, at its upper end, is turned outwardly, upwardly and away from the frame center at approximately a 45° angle to form a cam portion 22 adapted to be struck by the tire 24 as it is being lowered into the frame, Figs. 1 and 5.

Upon the rear posts 16 and 18, at two different levels, are fixed horizontal studs 26 and 28 parallel to each other and directed toward front posts 14 and 12. Upon the latter two posts are fixed horizontal sleeves 30 and 32 for slidably receiving the studs 26 and 28, respectively. Additional upper and lower horizontally directed and parallel studs 34 and 36 are fixed to each upright post at right angles to the planes of the studs 26 and 28 or sleeves 30 and 32. The studs 34 and 36 are received in sleeves 38 and 40, respectively. The sleeves are tied together by angle iron cross members 42. Each sleeve is formed with a horizontal slot 44 or 46, terminating short of the sleeve ends, for sliding reception of the pin members 48 which are removably positioned in openings in the ends of the studs 34 and 36.

The frame 10 may be lengthened by pulling apart upright posts 12 and 14 or 16 and 18 to the limit of movement permtted by pins 48 striking the end of the slots 44 and 46. Total separation of the uprights may only be accomplished by removal of the pins 48. Similarly, the frame may be widened by spreading apart the upright posts 14 and 16 or 12 and 18—this being permitted by movement of the studs 26 and 28 in the sleeves 30 and 32. If it is desired to limit the separation of the front and rear sides of the frame, the sleeves 30 and 32 may be provided with slots similar to slots 44, 46, and the studs 26 and 28 may be provided with pins similar to the pins 48.

Slidably received on the upper sleeves 32 are bifurcated or Y-shaped loop ends 50 of a lower metal band that preferably is formed in two sections 52 and 54 which are adjustably secured together by suitable means such as bolts 56 extending through selected openings in the sections, and which permit broad adjustment for tires of varying outer diameter. The loose engagement of the loop ends 50 on the sleeves 32 permit the band sections to be centered with respect to the tire tread by sliding toward one upright 14 or the other upright 16.

Also mounted loosely on the sleeves 32 and within the bifurcations of the loop ends 50, are the loop ends 58 and 60 of a pair of upper band sections 62 and 64. Band section 62 is pivotally attached centrally of the tension lever 66 whose lower end is formed with pivot pins 68. Band section 64 is secured to the bottom of a channel member 70 having upstanding side walls each provided with a plurality of angled slots 72. As shown in dotted lines in Fig. 1, the pins 68 of lever 66 may be dropped into a selected pair of the fulcruming slots 72 and the lever turned in a clockwise direction to take up the loop sections 62 and 64 to shorten the upper loop with section 62 sliding along and over section 64. The squeezing pressure thus imparted to the upper portion of the tire is transmitted through the tire to the lower band sections 52 and 54, which do not yield, so that the entire tire periphery is squeezed to the same degree. Since the upper and lower band sections are mounted adjacent to each other with no gap between their ends, they form and act essentially as one single, continuous, compression loop.

In use of the described device, the operator first mounts the tubeless tire 24 to rim 74, and then drops the assembled wheel into the frame 10 and onto the lower supporting band sections 52 and 54. If the frame is too small to receive the wheel, the tire will strike the upper cam ends 22 of the upright posts, see Fig. 5, and the wheel weight will spread the uprights to lengthen and widen the frame 10 adequately to receive the tire by relative sliding movement of the lateral connecting members, studs 26, 28, 34 and 36, in their respective sleeves 30, 32, 38 and 40.

Figure 4:
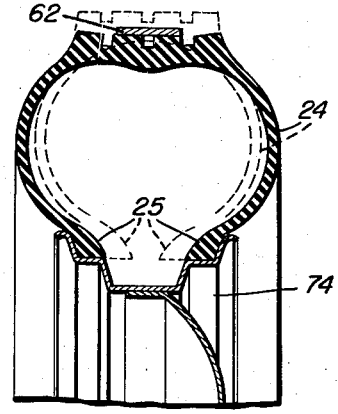
Fig. 4 is a transverse section of the tire casing taken on line 4—4 of Fig. 1, and showing the tire under squeezing pressure of the loop in full lines.

If necessary, by reason of a large change in the size of the tire being mounted, the bolts 56 securing loop sections 52 and 54 together may be displaced to adjust these sections for the particular tire being mounted prior to supporting the tire in the lower loop sections. The inner ends of the upper loop sections 62 and 64 are then placed together over the upper portion of the tire, and the tensioning lever 66 is moved to squeeze the tire, centrally of its peripheral tread in the manner previously described. This will cause the tire casing to bulge outwardly and move the beaded edges 25 of the tire into air sealing contact against the sides of the drop center channel of the rim and with the further assistance of air under pressure against the flanges of rim 74, as shown in Fig. 4. More inflating air may then be admitted to the tire through the valve stem 76, the loop members 62 and 64 being loosened prior to full inflation. Having completed the inflation of the tire, the operator lifts the wheel out of the frame which is then ready to receive another tire and rim assembly.

Because of the placement of sleeves 32 above the center of the frame 10, the application of the loop shortening pressure by lever 66 will not only squeeze the tire but also draw the frame in to fit the tire closely by pulling the uprights 12 and 18 toward the posts 14 and 16. Thus, whether the frame is smaller or larger at the time of insertion of a given tire, the adjustment of the frame size to fit the tire diameter is automatic. If the frame is too large, the shortening of loops 62 and 64 will reduce its size to fit the diameter of the tire; and if the frame is too small, the tire will force the upright apart sufficiently to permit insertion of the tire. If the frame is set too wide for the cross-sectional thickness of a particular tire, the loop ends 50 may be moved to center the loop on the tire, or if desired, the posts 14 and 16 may be pushed toward each other to lessen the width of the frame.

Figure 6:
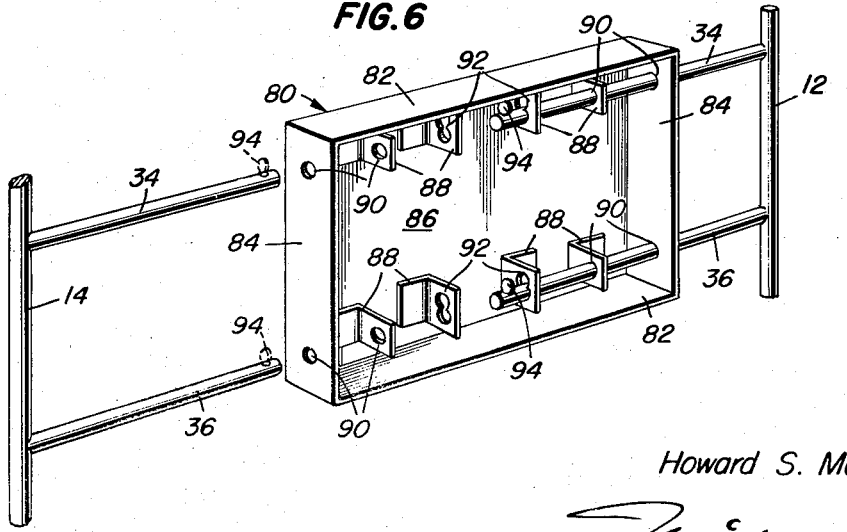
Fig. 6 is a fragmentary perspective view showing the frame side portion of Fig. 3 in a modified form.

In Fig. 6 is shown a modified frame in which a sheet metal box 80, inexpensive to make, is substituted for the sleeves 38 and 40. The box 80 has horizontal sides 82, connected by vertical sides 84, an inner side 86, and is open at the front. A plurality of brackets 88 aligned with each other and with either the studs 34 or 36 are mounted on the wall 86 within the box 80 or they may be struck from said inner wall 86. The outer brackets 88 and walls 84 are provided with openings 90 to receive the studs 34 and 36. The innermost brackets 88 are provided with figure 8-shaped openings 92 which pass the removable headed pins 94 in the ends of studs 34 and 36. Thus, the frame posts 12, 14, 16 and 18 may be assembled with studs 34 and 36 extending through openings 90 of box 80 to permit sliding adjustment apart of the posts to the limit defined by the outer brackets 88 whose round openings 90 prevent passage of the pins 94. In this construction, which is relatively inexpensive to manufacture, the same functions are performed as by the sleeve members 38 and 40.

Figure 7:
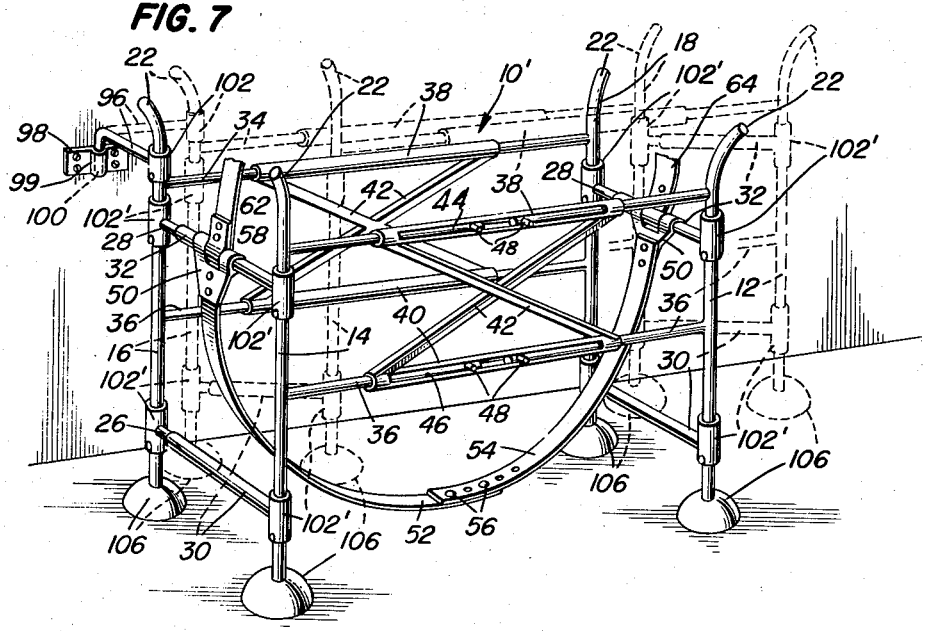
Fig. 7 is a reduced perspective view of a modified tire installing device showing the device in operative position ready for use in full lines, and in inoperative collapsed condition in dotted lines.
Figure 8:
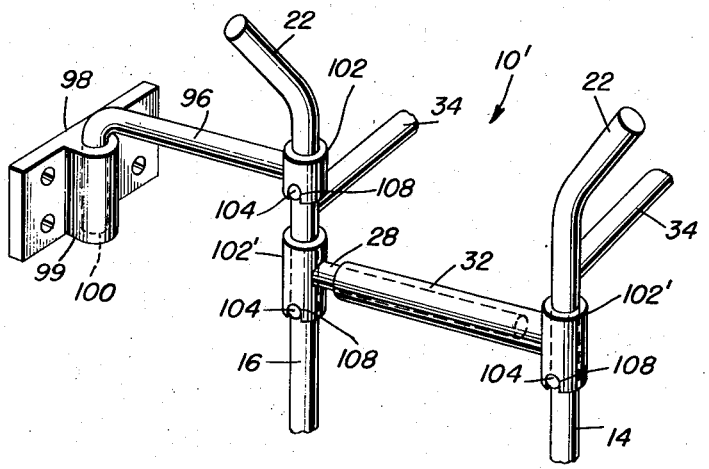
Fig. 8 is an enlarged perspective view of a wall-supported element utilized in the frame of Fig. 7.

In Figs. 7 and 8 is shown a modified frame 10' which is secured to a wall for stability, and which may be collapsed substantially into a single plane along the wall for storage. A bracket 98 fixed to the wall includes a socket 99 for pivotally receiving a down turned end 100 of the arm 96 which is secured at its other end by a collar 102 to the post 16 of the frame 10'. Collar 102 rotatively surrounds the post 16 and is supported at the proper elevation on the post by a removable pin 104. By swinging arm 96 in the socket 99 and the post 16 in the collar 102, the frame 10' may be moved from a conveniently useable position spaced from the wall to a position adjacent the wall.

To permit collapsing of the frame, the sleeves 30 and 32 and the studs 26 and 28 are similarly connected to their respective uprights 12, 14, 16 and 18 by collars 102' and removable detents 104. This permits the front and rear sides of the frame, as seen in Fig. 7, to be swung toward each other and into substantially the same plane lying adjacent the wall. By this arrangement, space is conserved when the tire installing device is not in use. When it is desired to install a tire, the frame is merely pulled from the wall, swinging on the arm 96, and the front, rear and sides are separated to permit entry of the tire. The connection of frame to the wall through arm 96 stabilizes the frame so that even very heavy tires may be installed. Additional stabilizing factors are the use of dome shaped feet 106 at the bottoms of the uprights 12, 14, 16 and 18, and the addition of notches 108 in collars 102, 102' to releasably lock the pins 104 in the operative positions of the frame parts. To return the frame to inoperative position, the collars 102, 102' are lifted slightly to disengage the pins 104 from notches 108, permitting collapse of the frame.

Although several embodiments of the invention have been shown and described, it is obvious that many modifications thereof are possible. The invention, therefore, is not to be restricted except insofar as is necessitated by the prior art and by the spirit of the appended claims.

What is claimed and desired to be secured by Letters Patent is:

1. An adjustable device for supporting a tubeless tire and assisting in seating the tire beads in air sealing contact with rim flanges, comprising a frame for supporting the rim mounted tire to be inflated, means carried by the frame for engaging about the entire periphery of the tire and exerting radial pressure thereon to squeeze the tire about its entire periphery so as to spread the tire beads into relative air sealing contact with the channel walls of a drop center rim and with the aid of inserted air pressure to further spread the beads against the flanges of the rim, said frame comprising upright posts connected by horizontal members, said means for engaging and squeezing the tire comprising a lower loop member connected at its ends to horizontal frame members which are parallel to the axis of a tire disposed in said frame for supporting the underside of the tire, a pair of flexible loop sections connected at their remote ends respectively to said horizontal frame members to which the lower loop member is connected, and means upon the pair of loop sections for releasably interconnecting said sections upon the exterior of the tire and to shorten the portions of said sections which are interconnected so that constricting pressure will be applied substantially to the entire central periphery of the tire through said lower loop member and said pair of flexible loop sections, said frame being extensible and retractable in a direction normal to the axis of the tire to assure the application of pressure about the entire periphery of the tire whereby there is an even distribution of force on said tire in the radial direction.

2. An adjustable device for supporting a tubeless tire and assisting in seating the tire beads in air sealing contact with rim flanges, comprising a frame for supporting the rim mounted tire to be inflated, means carried by the frame for engaging about the entire periphery of the tire and exerting radial pressure thereon to squeeze the tire about its entire periphery so as to spread the tire beads into relative air sealing contact with the channel walls of a drop center rim and with the aid of inserted air pressure to further spread the beads against the flanges of the rim, said frame comprising upright posts connected by horizontal members, said means for engaging and squeezing the tire comprising a lower loop member connected at its ends to said horizontal frame members for supporting the underside of the tire, a pair of flexible loop sections connected at their remote ends respectively to said horizontal frame members, and means upon the pair of loop sections for releasably interconnecting said sections upon the exterior of the tire and to shorten the portions of said sections which are interconnected so that constricting pressure will be applied substantially to the entire central periphery of the tire through said lower loop member and said pair of flexible loop sections, the connecting members forming two opposite sides of said frame being hingedly connected to said upright posts, whereby said frame may be collapsed with all of its sides falling into substantially one plane, one of said frame upright posts being hingedly connected to an arm whose other end is removably and pivotally connectible to a wall, whereby said frame may be swung on said arm from a storage position adjacent the wall to an operative position spaced from the wall.

3. An adjustable device for supporting a tubeless tire and assisting in seating the tire beads in air sealing contact with rim flanges, comprising a frame for supporting the rim mounted tire to be inflated, means carried by the frame for engaging about the entire periphery of the tire and exerting radial pressure thereon to squeeze the tire about its entire periphery so as to spread the tire beads into relative air sealing contact with the channel walls of a drop center rim and with the aid of inserted air pressure to further spread the beads against the flanges of the rim, said frame comprising upright posts connected by horizontal members, said means for engaging and squeezing the tire comprising a lower loop member connected at its ends to said horizontal frame members for supporting the underside of the tire, a pair of flexible loop sections connected at their remote ends respectively to said horizontal frame members, and means upon the pair of loop sections for releasably interconnecting said sections upon the exterior of the tire and to shorten the portions of said sections which are interconnected so that constricting pressure will be applied substantially to the entire central periphery of the tire through said lower loop member and said pair of flexible loop sections, the connecting members forming two opposite sides of said frame being hingedly connected to said upright posts, whereby said frame may be collapsed with all of its sides falling into substantially one plane, said hingedly connected lateral frame members being additionally provided with releasable detent means to releasably lock the frame in operative, noncollapsed condition and prevent a parallelogram displacement of the frame.

References Cited in the file of this patent

UNITED STATES PATENTS

| | | |
|---|---|---|
| 619,214 | Paul | Feb. 7, 1889 |
| 788,841 | Morris | May 2, 1905 |
| 1,395,847 | Lorey | Nov. 1, 1921 |
| 2,177,153 | Ross et al. | Oct. 24, 1939 |
| 2,684,112 | Coats | July 20, 1954 |
| 2,799,328 | Pitman | July 16, 1957 |
| 2,815,804 | Thomas | Dec. 10, 1957 |